(12) United States Patent
Redwood et al.

(10) Patent No.: US 9,964,204 B2
(45) Date of Patent: May 8, 2018

(54) ELECTRONIC SELECTOR SWITCH

(75) Inventors: Andrew Paul Redwood, Northville, MI (US); Steven R. Hoskins, Walled Lake, MI (US); Michael Tefend, Lake Orion, MI (US)

(73) Assignee: Kostal of America, Troy, MI (US)

( * ) Notice: Subject to any disclaimer, the term of this patent is extended or adjusted under 35 U.S.C. 154(b) by 1068 days.

(21) Appl. No.: 13/884,516

(22) PCT Filed: Nov. 9, 2011

(86) PCT No.: PCT/US2011/060065
§ 371 (c)(1),
(2), (4) Date: Aug. 5, 2013

(87) PCT Pub. No.: WO2012/064899
PCT Pub. Date: May 18, 2012

(65) Prior Publication Data
US 2013/0313086 A1 Nov. 28, 2013

Related U.S. Application Data

(60) Provisional application No. 61/411,742, filed on Nov. 9, 2010.

(51) Int. Cl.
*F16H 59/10* (2006.01)
*F16H 59/02* (2006.01)
*F16H 59/08* (2006.01)

(52) U.S. Cl.
CPC ............ *F16H 59/105* (2013.01); *F16H 59/02* (2013.01); *F16H 2059/081* (2013.01)

(58) Field of Classification Search
CPC ... F16H 59/02; F16H 59/105; F16H 2059/081
See application file for complete search history.

(56) References Cited

U.S. PATENT DOCUMENTS

| | | | | |
|---|---|---|---|---|
| 5,094,115 A | * | 3/1992 | Michihira | B60K 37/06 475/7 |
| 6,550,351 B1 | * | 4/2003 | O'Reilly | F16H 59/105 74/335 |
| 7,571,662 B2 | * | 8/2009 | Pickering | B60K 37/06 200/61.88 |

(Continued)

*Primary Examiner* — Jared Fureman
*Assistant Examiner* — Joel Barnett
(74) *Attorney, Agent, or Firm* — Butzel Long; Gunther J. Evanina

(57) ABSTRACT

An electronic selector switch assembly and method for a vehicle includes a housing and selector knob supported by a shaft. A knob position gear is connected to the selector knob and knob measurement gear is connected to the knob position gear. A first sensor senses an angular position of the selector knob. A rack is rotatable about the shaft and selector knob and a rack measurement gear is connected to the rack. A second sensor senses a position of the rack measurement gear. A drive assembly is connected to the rack, and if the knob position, rack position and transmission gear position do not compare, the drive assembly realigns the rack to match the transmission gear position. The methodology periodically senses selector knob and transmission gear positions to determine if there is a mismatch, and locks the selector knob position and adjusts the rack position if there is a mismatch.

14 Claims, 5 Drawing Sheets

(56) References Cited

U.S. PATENT DOCUMENTS

| | | | |
|---|---|---|---|
| 2003/0029261 A1* | 2/2003 | DeJonge | B60K 37/06 74/335 |
| 2004/0162661 A1* | 8/2004 | Kikuchi | B60K 37/06 701/62 |
| 2006/0037424 A1 | 2/2006 | Pickering et al. | |
| 2009/0000407 A1* | 1/2009 | Meyer | B60K 37/06 74/10.1 |
| 2009/0055059 A1 | 2/2009 | Jerger et al. | |
| 2009/0271080 A1 | 10/2009 | Pickering et al. | |

\* cited by examiner

ELECTRONIC SELECTOR SWITCH

CROSS-REFERENCE TO RELATED APPLICATIONS

This application claims priority to U.S. Provisional Patent Application No. 61/411,742 filed Nov. 9, 2010 and PCT Application No. PCT/US2011/060065 filed Nov. 9, 2011, which are hereby incorporated by reference in their entireties.

BACKGROUND

The present disclosure relates generally to a switch for a vehicle, and more particularly to an electronic selector switch for use in a vehicle and a method of controlling the switch.

DESCRIPTION OF THE RELATED ART

Vehicles generally include systems that may be mechanical, electrical or electro-mechanical in operation. For example, a mechanically operated gear or drive selector may be mechanically connected to a mechanically controlled transmission for selecting the transmission gear, such as drive, park, reverse or neutral or the like for an automatic transmission. For a manual transmission, $1^{st}$, $2^{nd}$, $3^{rd}$, $4^{th}$ and reverse gears or the like may be selected. The drive selector may be a mechanical lever that is moveable between the various gear positions. In another example, the transmission may be an electronically controlled transmission also referred to as "shift by wire", and the driver's intent is communicated electronically to the transmission. An electronic selector switch may be utilized by the vehicle operator to electronically communicate the selected transmission gear.

While existing electro-mechanical systems work well, there is the potential for the electronically controlled system to enter a mode that may be different than the mechanically indicated mode, resulting in a "mismatch". For example, in an electronic transmission, the gear selection may electronically revert to a predetermined operating mode under a predetermined condition, i.e. revert to the PARK mode if the vehicle stalls during operation. At the same time, the mechanical selector switch may still be indicating a DRIVE mode, especially if the user fails to manually actuate the selector switch to an initial position, such as the PARK position prior to a restart of the engine. This may result in a mismatch between the mechanical position of the control in comparison to the actual status of the transmission.

Thus, there is a need in the art for an electronic selector switch that continuously monitors the alignment between the actual mechanical selector control position and the current operating state of the controlled system, and automatically corrects the actual mechanical selector control position to correspond with the current operating state of the controlled system.

SUMMARY

Accordingly, the present disclosure relates to an electronic selector switch assembly for use in a vehicle and includes selector switch housing and a selector knob supported by a shaft. A knob position gear is connected to the selector knob and the knob measurement gear is connected to the knob position gear. A first sensor senses an angular position of the selector knob. A rack is rotatable about the shaft and selector knob and a rack measurement gear is connected to the rack. A second sensor senses a position of the rack measurement gear. A drive assembly is connected to the rack, and if the knob position, rack position and transmission gear position do not compare, the drive assembly realigns the rack to match the transmission gear position. The methodology periodically senses selector knob and transmission gear positions to determine if there is a mismatch, and locks the selector knob position and adjusts the rack position if there is a mismatch.

An advantage of the present disclosure is that an electronic selector switch assembly is provided that is ergonomically accessible. Another advantage of the present disclosure is that the electronic selector switch assembly monitors the mechanical position of the selector knob and the electronic state of the system and realigns the detent portion of the selector knob to be within the detent profile limits if a mismatch is detected. Still another advantage of the present disclosure is that the electronic selector switch assembly includes an integral lock-out function that is simple to operate. A further advantage of the present disclosure is that the electronic selector switch assembly is cost effective to implement. Still a further advantage of the present disclosure is that a mismatch between a mechanical position and an electronic state is corrected, even after a power interruption. Yet a further advantage of the present disclosure is that various movements of the selector knob can be accommodated, such as a push to rotate or pull to rotate block out function. Still yet a further advantage of the present disclosure is that varying detent forces can be allowed between mechanical positions of the selector to enhance ergonomic feel of the selector knob.

Other features and advantages of the present innovation will be readily appreciated, as the same becomes better understood in view of the subsequent description taken in conjunction with the accompanying drawings.

DESCRIPTION

Figure 1:
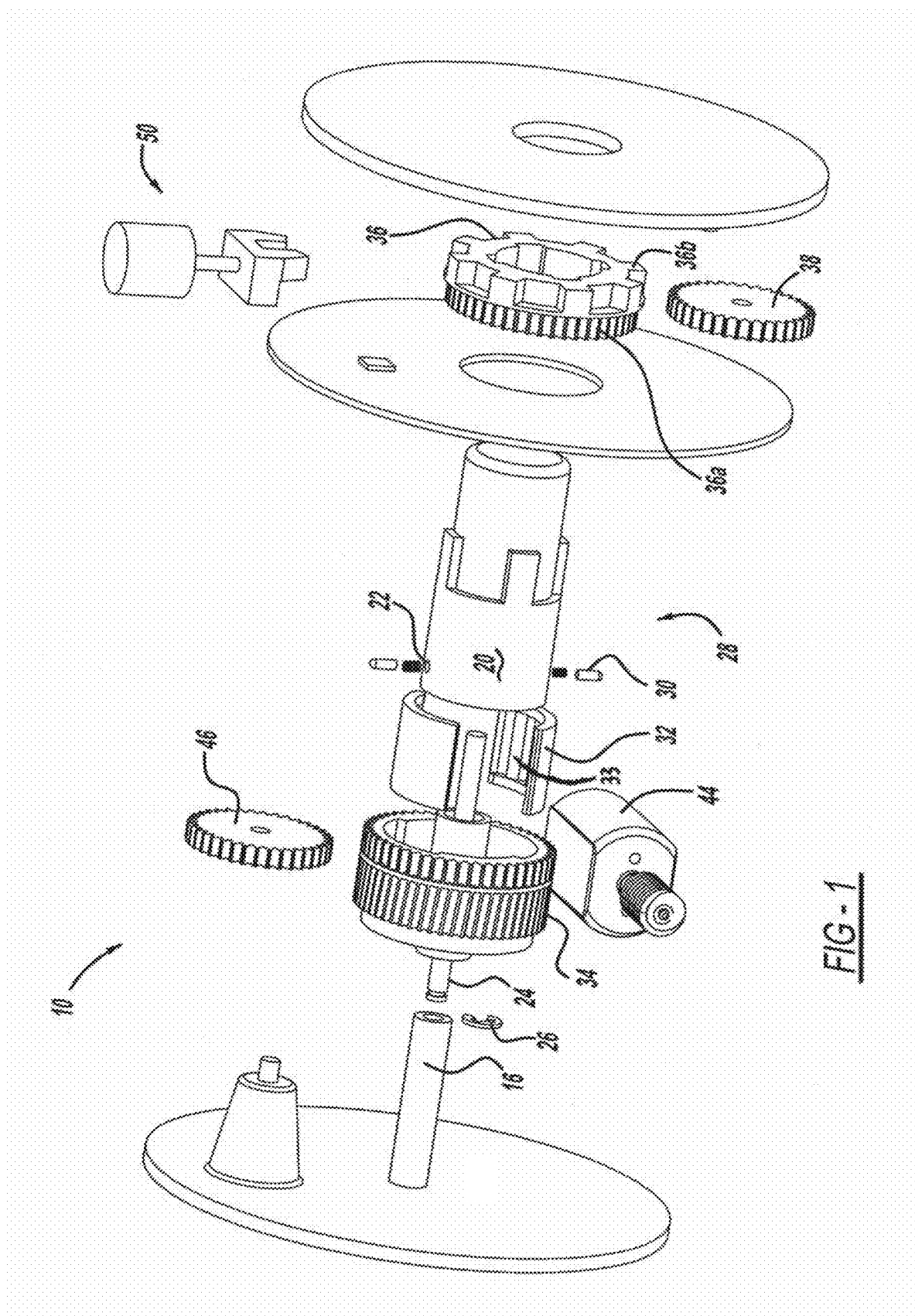
FIG. 1 is an exploded view of a selector switch assembly.
Figure 2:
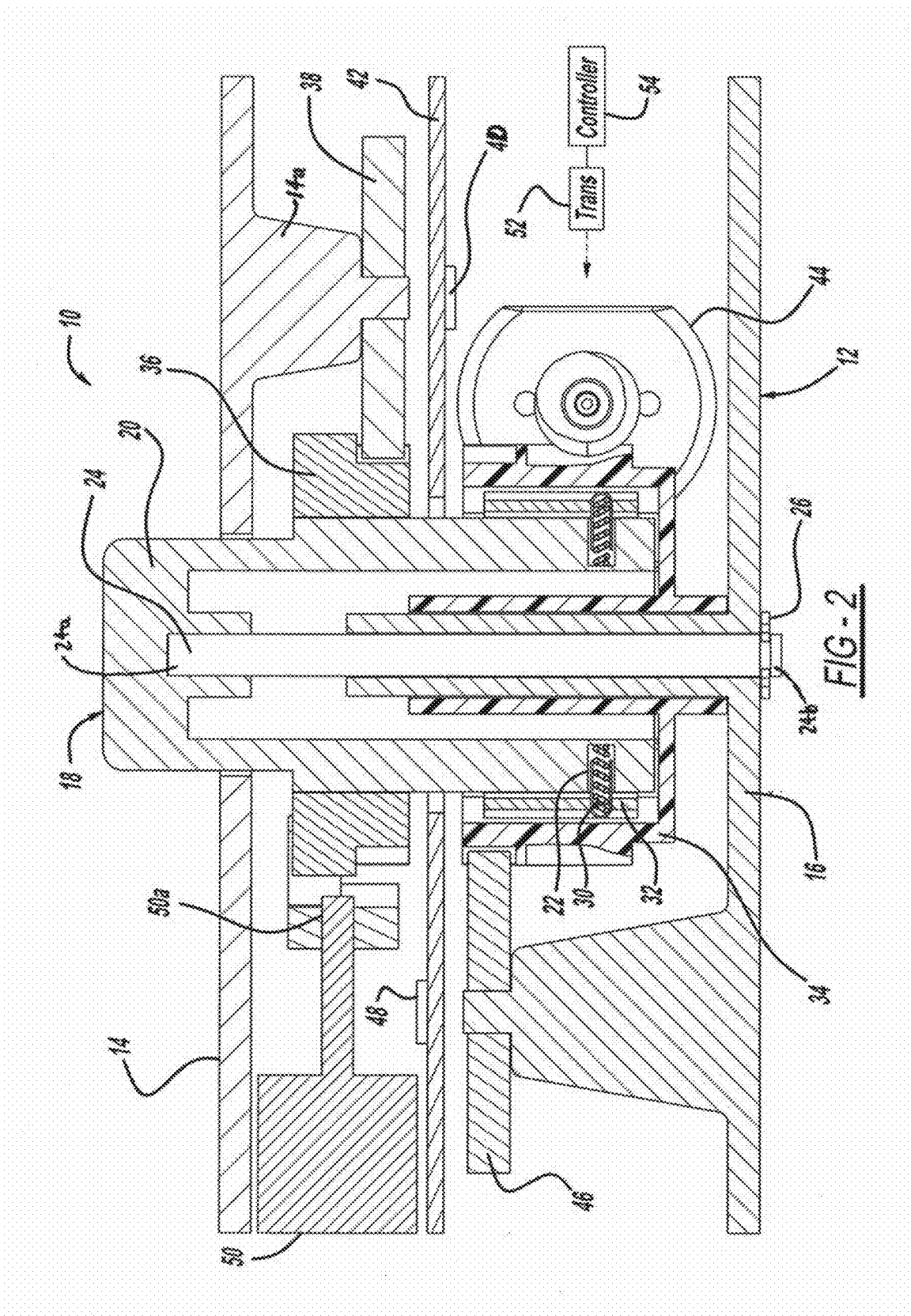
FIG. 2 is a sectional view of the selector switch assembly of FIG. 1.

Referring to FIGS. 1-2, a electronic selector switch assembly 10 is provided. The selector switch assembly 10 is utilized with a vehicle, such as a motor vehicle, although it may be adapted for use in any application where a mismatch may occur between an input device and electronic controller resulting in the input device and electronic controller being out of phase with each other. In this example, the switch is utilized in conjunction with an electronically controlled transmission (not shown), although it could be utilized with other types of vehicle systems.

The electronic selector switch assembly 10 is contained within a housing 12. The electronic selector switch assembly 10 is positioned on the vehicle so as to be accessible by the vehicle operator. In this example, the electronic switch assembly 10 is disposed on the center console (not shown), although it could be located on the instrument panel or another location. The switch housing 12 includes an upper wall 14, that could be a curvolinear surface or generally planar, and may include indicia (not shown) relating to predetermined user selectable options. In this example, the user selectable options communicate to the user the transmission state currently being broadcast on the vehicle bus. Alternatively, the indicia could be included with the instrument panel. For example, the indicia may relate to the operating mode of the transmission, such as park, reverse, neutral, or drive or the like. Alternatively, the indicia may be on the selector knob. It should be appreciated that the indicia may utilize a light indicator, such as an LED, to facilitate selection, such as in a low light situation.

The housing includes a lower wall 16 that is spaced a predetermined distance from the upper wall 14, and provides a support for certain selector switch assembly components. The lower wall 16 is generally planar, and may include upstanding supports or bosses for supporting various components in a manner to be described. The housing 12 may also include a vertically oriented outer wall (not shown) to enclose the selector switch components.

The electronic selector switch assembly 10 includes a selector knob 18 for selecting a predetermined function for the controlled system, such as of the transmission of this example. At least a portion of the selector knob 18 is moveable by the user, and various types of movements are contemplated, such as rotatable, or translational (pushing), slidable or a combination of movements. The selector knob 18 is operatively in communication with a controlled system 52, such as the transmission of this example, and transfers information from the operator regarding the desired vehicle operating condition. Examples of operating conditions for an automatic transmission include park, neutral, reverse and drive gears. The transmission may be an electronically controlled transmission or a mechanically controlled or a combination thereof.

The selector knob 18 includes a housing 20 having a predetermined shape. In this example, the housing 20 is cylindrical and includes an upper portion that is activated by the user and a lower portion that located within the switch housing 12. Various shapes of the selector knob housing 20 are contemplated. In addition, the selector knob housing 20 could be formed using one piece or multiple pieces. An interior surface of a wall of the selector knob housing 20 includes an integrally formed channel 22 extending between an outer surface and an inner surface of the selector knob housing 20 for a purpose to be described.

The selector knob 18 is fixedly mounted to a centrally located shaft 24 having a first end 24a extending through an opening in the switch housing lower wall 16 and a second end 24b extending vertically through an opening in the switch housing upper wall 14. The selector knob 18 rotates about the second end 24b of the shaft 24 in this example, and the first end 24a is secured to the lower wall 16 of the switch housing 12 using a fastener 26, such as an e-clip or the like.

The electronic selector switch assembly 10 further contains a tactile feedback mechanism 28 that provides the user with a tactile feedback when the selector knob 18 is manipulated. For example, the tactile feedback mechanism 28 may be a plurality of detent plungers 30, each disposed within a corresponding channel 22 in a wall portion of the selector knob housing 20. Various shapes of the detent plunger are contemplated, for example a cylindrical shape having a curolinear outermost end. Each detent plunger 30 interfaces with a detent member 32. In this example, the detent member 32 is a detent profile 32 that is in communication with an annular gear 34. In this example, the annular member is a rack 34. The detent profile 32 may be disposed within a cut out portion formed in an interior wall of the rack 34. An interior portion of the detent profile 32 includes an integrally formed ramp 33 having a "V" cross-sectional shape and extending from an upper edge to a lower edge of the detent profile 32. The detent profile 32 may include a plurality of ramps. Alternatively, the detent profile 32 could be engaged by a separate member that creates the angular ramp 33. Each ramp 33 has a corresponding angle, which provides a different force effect corresponding to a predetermined angular displacement. It should be appreciated that relative movement between the detent plunger 30 and the detent profile 32 is achieved by the mechanical retention created by the interface of the rack gear profile and a drive assembly, such as a continuous worm drive assembly.

The electronic selector switch assembly 10 also includes a plurality of drive mechanisms, such as gears, pulleys or the like, and the type is non-limiting. A selector knob position gear 36 is positioned circumferentially around the center shaft 24 and adjacent the selector knob housing 20. The knob position gear 36 is operatively connected to the selector knob 18, i.e. via a spline fit or the like, so as to rotate together with the selector knob 18. The knob position gear 36 is generally planar, and includes a plurality of gear teeth 36a arranged circumferentially around the knob position gear 36. The gear teeth 36a meshingly interact with a knob measurement gear 38 in a manner to be described. The knob position gear 36 also includes a plurality of tabs 36b that interface with the lock out mechanism to control movement of the knob 18. The tabs 36b are formed in an upper portion of the knob position gear 36, above the gear teeth 36a. An example of a lock out mechanism is a solenoid or motor, and engagement of the lock out mechanism with the tabs 36b prevents the selector knob 18 and knob position gear 36 from moving under a predetermined condition in a manner to be described.

The knob measurement gear 38 may be a generally planar gear, or another type of gear, such as a spur gear with involute teeth, of the like. The knob measurement gear 38 operatively engages the teeth of the knob position gear 36. The knob measurement gear 38 operatively serves as an interface between the knob position gear 36 and a sensing element in a manner to be described. The knob measurement gear 38 may be fixedly mounted within the housing 14, such as to the inner face of the housing upper wall 14. For example, a mounting boss 14a is integrally formed in the housing upper wall 14 and extends vertically from the inner surface of the bezel 14 to receive the knob measurement gear 38.

The selector switch assembly 10 includes a first sensor 40 in communication with the knob measurement gear 38. The first sensor 40 is mounted to a substrate 42, such as a printed circuit board or PCB. Further, the substrate may be mounted within the switch housing shaft 24. Various types of sensors as contemplated, such as a sensor that senses the angular position of the knob position gear 36 and the selector knob 18 via the knob measurement gear 38. An example of an angular sensor is a magnet and hall element or the like.

The electronic selector switch assembly 10 includes a drive mechanism 44 located within the housing 14. The drive mechanism 44 may be mounted to the switch housing 12, such as to the switch housing lower wall 16. In this example, the drive mechanism 44 is a continuous worm drive assembly which contains an electric motor that operatively interfaces with a gear profile on the outer diameter of the rack 34. The drive assembly energizes the motor to rotate the rack in a manner to be described.

The electronic selector switch assembly 10 still further includes a rack 34 circumferentially mounted about the center shaft 24. For example, the rack 34 may be a cup shaped gear member that rotates about the center shaft 34 when the drive assembly is energized. Other types of rack shapes are contemplated. In this example, the outer surface of the rack 34 includes an integrally formed gear profile that interfaces with a rack measuring gear. The rack 34 operatively contains the detent profile 32.

The electronic selector switch assembly 10 also includes a rack measurement gear 46 for detecting a movement of the rack 34. In this example, the rack measurement gear 46 is positioned on an opposite side of the shaft 24 than the knob measurement gear 38, and interfaces with the outer surface of the rack 34, although it could be packaged in another location depending on packaging constraints. In this example, the rack measurement gear 46 is supported by an upstanding boss formed in the switch housing lower wall 16a. The rack measurement gear 46 may be a generally planar gear having a plurality of teeth. A relative position of the rack measuring gear 46 may be detected by a second sensor 48 mounted to the substrate 42 and in operative communication with the rack measurement gear 46. The second sensor 48 may be a similar angular sensor as the first sensor 40, to sense the relative angular position between the rack 34 and corresponding detent profile 32.

The electronic selector switch assembly 10 further includes a lock out mechanism 50. In this example, the lockout mechanism 50 is utilized to lock the selector knob 18 and knob position gear 36 in or out of a predetermined position, depending on the operating condition. In this example, the lock out mechanism 50 includes a solenoid or motor 52 and associated mechanical lock member 54 to achieve a lock out function by mechanically blocking movement of the selector knob and knob position gear.

In operation, the user actuates the electronic selector switch assembly 10 via movement of the selector knob 18 to select a desired transmission operation, referred to as a transmission gear 52, such as park, reverse, neutral, drive or other gear state as commanded by the vehicle transmission. Movement of the selector knob 18 results in a corresponding movement of the knob position gear 36 and thus the knob measurement gear 38. The first angle sensor 40 senses the resulting angular position of the knob measurement gear and the angular position is transmitted to a transmission shifter module 52, which analyzes the signal and transmits a signal to the controller 54. The controller 54 analyzes the signal from the shifter module and other vehicle inputs and determines if and when to shift gears, and the transmission 52 implements the action.

However, under certain operating conditions, the transmission 52 may revert to a default condition. As a result, the selector knob 18 may be pointing to a different indicia or position than the actual transmission operating condition or mechanical position of the detents and end stops. This misalignment restricts/inhibits further use of the selector knob 18. This may result in operator confusion, such as when restarting the vehicle. For example, in some applications, such as an electronic shift by wire system (e-shifter), it is required that the operator manually move the selector knob 18 to the PARK position for confirmation (i.e. rotating to park) prior to the device powering down. Another example of a default condition is that when the vehicle is powered down, the transmission will default to the 'PARK' condition. At power up, the transmission will report 'PARK' to the e-shifter module and it will accordingly indicate park. If the vehicle stalls during operation and the operator fails to manually rotate the selector to the PARK position prior to power up, a mismatch between the mechanical position of the knob/detents and the electronic signal output/visual indicators occurs.

Thus, to prevent a mismatch between the selector knob 18 and the transmission gear position, the drive mechanism 44 is energized. During normal operation of the selector knob 18, the rack 34 is stationary. The selector knob 18 is free to move within the constraints defined by the corresponding detent profile 32 in the rack 34. The detent profile 32 located in the rack 34 provides the restraint/feedback to the operator when actuating the selector knob 18. The selector knob 18 can also provide an optional push/pull actuation direction, thus allowing the operator to perform a second action to rotate selector knob to certain positions.

To determine if a mismatch has occurred between a selector knob 18 and a transmission gear, the modules' onboard electronics compare an output value generated from the position of the knob measurement gear determined via the first sensor 40 to the output value generated from the position of the rack measurement gear 46 determined by the second sensor 48. The controller includes onboard software that verifies, through a correction algorithm if a realignment of the rack 34 is required. For example, if the system is powered down or loses power and the operator does not manually rotate the selector knob 18 to the PARK mechanical position or state prior to power up, a mismatch between the electronic state of the module and mechanical state will occur. In the event a mismatch occurs between the electronic and mechanical state of the module, the module will transmit a signal to move the rack 34 and detent assembly position to correspond with the transmission gear position 52. The lock-out mechanism 50 will engage the knob position gear 36 to prevent it and the selector knob 18 from any movement. Next, the drive mechanism 44 is energized, causing a corresponding rotational movement of the rack 34, detent profile 32 and rack measurement gear 46. When the rack measurement gear 46 rotates sufficiently to generate the required output in the second sensor, the on board software will signal the drive assembly to stop moving. Finally, the lock-out mechanism 50 will release the knob position gear 36 and selector knob 18 so that normal operation may resume.

Figure 3:
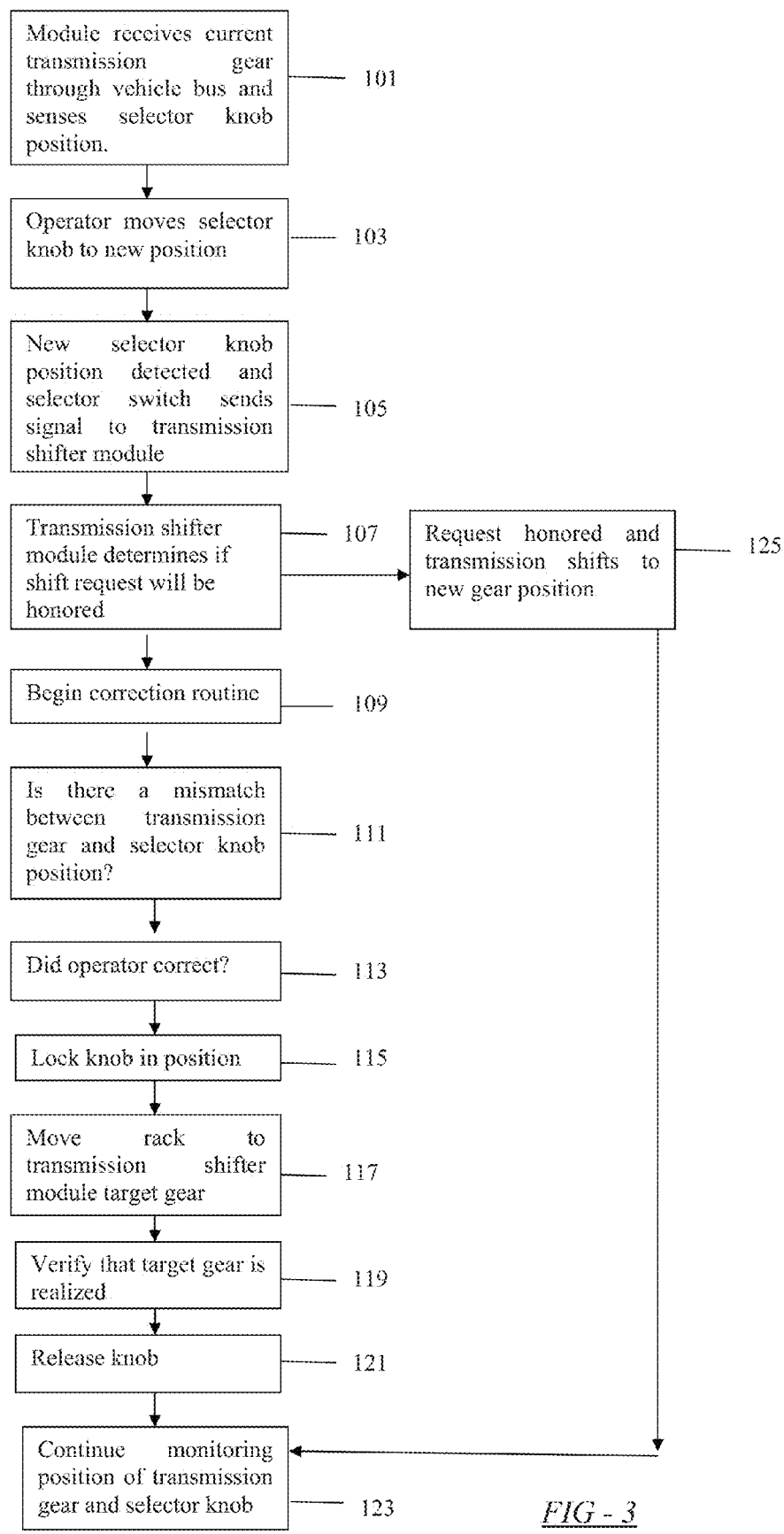
FIG. 3 is a flowchart describing the operation of the selector switch assembly of FIG. 1.

Referring to FIG. 3 a method of electronic selector switch operation is described using the electronic selector switch 10. The methodology begins at step 101, and a position of the current transmission gear is determined. For example, the position of the current transmission gear is determined by a controller 54 that receives a signal through the vehicle bus. The position of the selector knob 18 is also sensed, as previously described.

The methodology advances to step 103, and the user actuates the selector knob 18 to a new position (e.g., from park to reverse). The methodology advances to step 105, and the last known stable position of the electronic selector switch 10 is determined. For example, the electronic selector switch 10 retains and reports on the vehicle bus to the transmission shifter module 52 (and may additionally illuminate the indicia) through its internal software algorithm, the last known stable position of the electronic selector switch 10.

The methodology advances to step 107, and it is determined if a transmission shift request will be honored. For example, the transmission shifter module 52 determines if a shift request 103 will be honored. If the operator has moved the selector knob 18 sufficiently past the peak detent force, the detent profile 32 will pull the selector knob 18 into the next stable position. Software facilitates the detection of whether a new detent boundary threshold has been passed while the mechanical peaks are traversed. Once a new boundary is detected, the new stable position is latched and sent on to the vehicle bus.

If determined that the shift request should be honored, the methodology advances to step 125, the request is honored and the transmission shifts to a new gear position. Returning to step 107, if determined that the request should not be honored, the methodology advances to step 109 and a correction routine is initiated. Next, at step 111, a determination is made regarding whether there is a mismatch between the transmission gear and the selector knob 18 position, as previously described The methodology advances to step 113, and a determination is made regarding whether the operator performed a correction. For example, it is determined if the operator moved the knob to the actual transmission gear. If a correction was not performed, the methodology advances to step 115 and the selector knob 18 is locked in position. For example, the locking mechanism engages the lockout mechanism 50 to lock the selector knob 18 and knob position gear 36 in a predetermined position.

The methodology advances to step 117 and the rack is moved until a target gear specified by the transmission shifter module 52 is achieved. The methodology advances to step 119, and the methodology verifies whether the target gear is realized. If the target gear has been realized, the methodology advances to step 119 and the selector knob 18 is released.

The methodology advances to block 121 and the position of the transmission gear and the selector knob 18 continues to be monitored.

Figure 4:
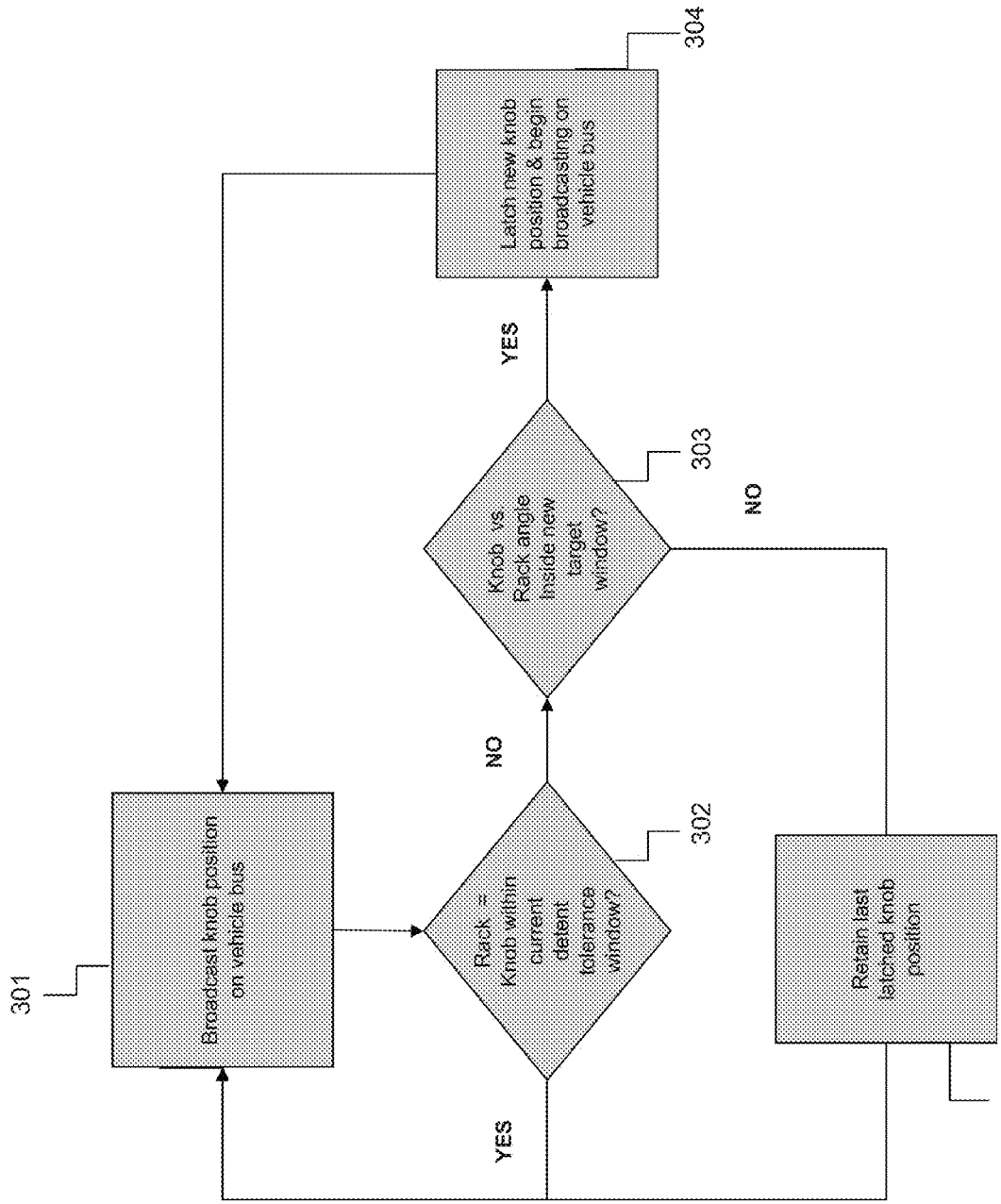
FIG. 4 is a flowchart describing the monitoring of the selector switch knob position.

Referring to FIG. 4, a flowchart further illustrating a methodology for monitoring the position of the selector knob 18. The methodology periodically checks selector knob position during operation of the vehicle. For example, the selector knob position is checked at selected intervals. Operation of the selector knob 18 advantageously includes hysteresis to provide confirmation. The methodology begins at step 301 by periodically determining a selector knob position. For example, the selector knob position is sensed by the knob position gear 36 and knob measurement gear 38 as previously described and broadcast to the controller, such as via a vehicle bus.

The methodology advances to step 302, and it is determined if the rack 34 and selector knob 18 are within a predetermined detent profile 32 tolerance range. If determined that the rack 34 and selector knob 18 are within a predetermined detent profile tolerance range, the methodology returns to step 301 and continues to monitor the selector knob position.

If determined that the rack 34 and selector knob 18 are not within a predetermined detent profile tolerance range, the methodology advances to step 303 and it is determined if the selector knob position and rack angle are within a newly predetermined target range. For example, the rack measurement gear 46 position may be detected by a second sensor 48. If determined that the selector knob position and rack angle are within a newly predetermined target range, the methodology advances to step 304 and the selector switch assembly 10 locks the selector knob 18 into the new knob position via engagement of the lock out mechanism 50. The position of the selector knob 18 is broadcast on a communications network or bus. The methodology returns to step 301 and continues.

If determined that the selector knob position and rack angle are not within a newly predetermined target range, the methodology advances to step 305 and the last position of the locked selector knob is retained using the lock out mechanism 50.

Figure 5:
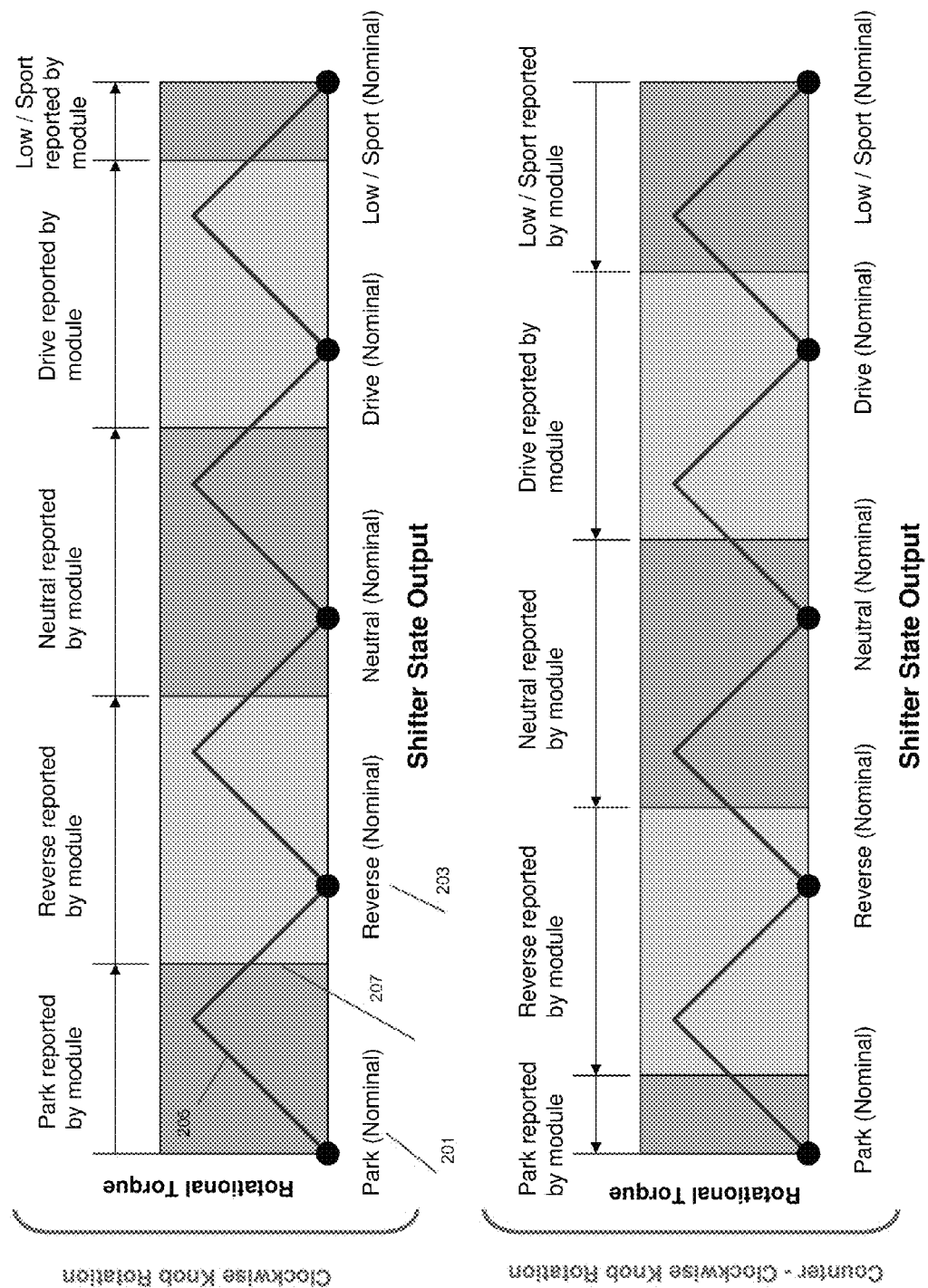
FIG. 5 is a diagrammatic view of a user performing a clockwise and counter-clockwise knob rotation operation.

The operation of the selector knob 10 is graphically illustrated in FIG. 5. The clockwise rotation of selector knob 18 from a position park 201 to a reverse position 203 is shown. Additionally, a peak detent force 205 and detent boundary threshold 207 is demonstrated.

If the user desires to actuate the selector knob 18 back to its previous stable position once the new shifter stable position is detected within the selector switch assembly 18 and broadcast on the vehicle bus (i.e., a rock cycle), the selector switch assembly 18 will require the user to actuate the selector knob 18 past the peak detent force again and the detent profile 32 will pull the selector knob 18 into the previous stable position.

Many modifications and variations of the present invention are possible in light of the above teachings. Therefore, within the scope of the appended claims, the present invention may be practiced other than as specifically described.

What is claimed is:

1. An electronic selector switch assembly for use in a vehicle comprising:
   a housing;
   a selector knob supported by a shaft within the housing;
   a knob position gear operatively connected to the selector knob;
   a knob measurement gear operatively connected to the knob position gear;
   a first sensor in communication with the knob measurement gear that senses an angular position of the selector knob and transmits a first output signal indicating a selector knob angular position;
   a rack supported about the shaft, the rack being rotatable about the shaft and the selector knob;
   a rack measurement gear operatively connected to the rack;
   a second sensor in communication with the rack measurement gear that senses an angular position of the rack measurement gear and transmits a second output signal of the rack angular position; and
   a continuous worm drive assembly operatively connected to the rack, said worm drive assembly rotating the rack to match the rack position to a transmission gear position based on the first output signal and the second output signal.

2. The electronic selector switch assembly of claim 1, further comprising a lock out mechanism operatively connected to the selector knob and the knob position gear, to lock the selector knob and the knob position gear in a predetermined position before realigning the rack.

3. The electronic selector switch assembly of claim 1, further comprising a tactile feedback mechanism for the selector knob.

4. The electronic selector switch assembly of claim 3, wherein the tactile feedback mechanism includes a plurality of detent plungers and a detent profile having a ramp that interfaces with the plurality of detent plungers.

5. The electronic selector switch assembly of claim 4, wherein the plurality of detent plungers are disposed within a corresponding channel in a wall portion of the housing.

6. The electronic selector switch assembly of claim 1, wherein the selector knob is fixedly mounted to the shaft, and the shaft includes a first end extending through an opening in a lower wall of the housing and a second end extending vertically through an opening in an upper wall of the housing, and the selector knob rotates about the second end of the shaft and the first end of the shaft is secured to the lower wall of the housing.

7. The electronic selector switch assembly of claim 1, wherein the knob position gear is positioned on the shaft.

8. The electronic selector switch assembly of claim 1, wherein the rack measurement gear and the knob measurement gear are located on opposite sides of the shaft.

9. The electronic selector switch assembly of claim 1, wherein the angular position of the selector knob is continuously monitored during operation of the vehicle.

10. A method of controlling an electronic selector switch for a vehicle, said method performed by a control device, and comprising the steps of:
   detecting a position of a selector knob portion of the electronic selector switch;
   detecting a gear position of a transmission;
   determining if there is a mismatch between the gear position of the transmission and the position of the selector knob, and locking the position of the selector knob and adjusting a rack position via rotation using a worm drive assembly to match the gear position if there is a mismatch.

11. The method as set forth in claim 10 further comprising the step of moving the selector knob to a new position prior to the step of detecting the position of the selector knob.

12. The method as set forth in claim 10 wherein the selector knob is supported by a shaft, a knob position gear is operatively connected to the selector knob, a knob measurement gear is operatively connected to the knob position gear, a first sensor is in communication with the knob measurement gear to sense an angular position of the selector knob and transmit a first output signal of the angular position of the selector knob, a rack is supported about the shaft and is rotatable about the shaft and the selector knob, a rack measurement gear is operatively connected to the rack, a second sensor is in communication with the rack measurement gear to sense an angular position of the rack measurement gear and transmit a second output signal of the angular position of the rack and a drive assembly is operatively connected to the rack, and the first output signal and the second output signal are compared with a transmission gear position, and if the first output signal and the second output signal do not compare to the transmission gear position, the worm drive assembly is energized to realign the rack to match a position of the transmission gear position.

13. A method of controlling an electronic selector switch, said method performed by a control device, and comprising the steps of:
   determining a selector knob position using a first sensor, wherein a selector knob measurement gear is connected to a selector knob;
   generating a first signal of the selector knob position;
   determining a rack position using a second sensor, wherein a rack measurement gear is connected to the selector knob;
   generating a second signal of the rack position;
   comparing a transmission state signal of a transmission state with the first signal and the second signal; and
   energizing a worm drive mechanism to rotate and realign a rack to correspond with the transmission state upon detection of a mismatch between the transmission state signal and the first signal and the second signal.

14. The method as set forth in claim 13 further comprising the step of monitoring the selector knob position by:
   periodically checking the selector knob position;
   determining if the rack and the selector knob are within a predetermined detent profile tolerance range, and continuing to monitor the selector knob position if determined that the rack and the selector knob are both within the predetermined detent profile tolerance range;
   determining if the selector knob position and the rack are within a new predetermined target range if determined that the rack selector knob and the rack are both not within the predetermined detent profile tolerance range; and
   locking the selector knob into a new knob position via engagement of a lock out mechanism if determined that the selector knob position and rack are within a new predetermined target range, and retaining a last position of a locked selector knob using the lock out mechanism if determined that the selector knob position and the rack are not within a newly predetermined target range.

\* \* \* \* \*